(12) United States Patent
Vasudevan et al.

(10) Patent No.: US 8,948,107 B2
(45) Date of Patent: Feb. 3, 2015

(54) METHOD AND APPARATUS FOR RESOURCE ALLOCATION FOR DEVICE-TO-DEVICE COMMUNICATION

(75) Inventors: Subramanian Vasudevan, Morristown, NJ (US); Kathiravetpillai Sivanesan, Richardson, TX (US)

(73) Assignee: Alcatel Lucent, Boulogne-Billancourt (FR)

( * ) Notice: Subject to any disclaimer, the term of this patent is extended or adjusted under 35 U.S.C. 154(b) by 254 days.

(21) Appl. No.: 13/484,863

(22) Filed: May 31, 2012

(65) Prior Publication Data

US 2013/0322345 A1 Dec. 5, 2013

(51) Int. Cl.
 *H04W 72/04* (2009.01)
(52) U.S. Cl.
 USPC ........................... 370/329; 455/452.2
(58) Field of Classification Search
 CPC ..................................... H04W 72/04
 See application file for complete search history.

(56) References Cited

U.S. PATENT DOCUMENTS

| | | | |
|---|---|---|---|
| 2010/0093364 A1* | 4/2010 | Ribeiro et al. | 455/452.2 |
| 2011/0194485 A1* | 8/2011 | Horneman et al. | 370/315 |
| 2011/0223953 A1 | 9/2011 | Lee et al. | |
| 2013/0242866 A1* | 9/2013 | Lin et al. | 370/328 |

FOREIGN PATENT DOCUMENTS

| | | |
|---|---|---|
| WO | WO 2010/049801 | 5/2010 |
| WO | WO 2011/088609 | 7/2011 |
| WO | WO 2012/049351 | 4/2012 |

OTHER PUBLICATIONS

International Search Report dated Feb. 10, 2014 in corresponding Application No. PCT/US2013/043205.

* cited by examiner

*Primary Examiner* — Jianye Wu
(74) *Attorney, Agent, or Firm* — Harness, Dickey & Pierce (57) ABSTRACT

In one embodiment, the method of allocating network resources by a base station of a network includes allocating at least two blocks of an uplink channel of the network to a direct communication link between a first user equipment (UE) and a second UE. The method further includes determining that a rate of data transfer on the direct communication link is greater than a rate of data transfer for uplink communications between one of (i) the first UE and base station and (ii) the second UE and the base station. The method further includes re-allocating, based on the determining, at least one of the at least two uplink blocks allocated to the direct communication link to at least one of uplink communications by the first UE, the second UE, or other UEs with the base station.

18 Claims, 7 Drawing Sheets

METHOD AND APPARATUS FOR RESOURCE ALLOCATION FOR DEVICE-TO-DEVICE COMMUNICATION

BACKGROUND

In device-to-device communications, user equipments (UEs) communicate with each other. Conventional UEs are equipped to transmit on the uplink and receive on the downlink, while base stations receive on the uplink and transmit on the downlink. Device-to-device communication may be used for at least public safety and social networking.

To improve public safety, device-to-device communication is used where the cellular infrastructure is unavailable. Device-to-device communication allows user equipments (UEs) to communicate with each other directly in emergency situations.

Device-to-device communication is also used in social networking. More specifically, device-to-device communication allows proximate UEs to share information.

SUMMARY

Example embodiments are directed to a method and/or apparatus for resource allocation for device-to-device communication. The method and apparatus permit an operator to allocate portions of uplink channels for device-to-device communications while allowing devices in direct device-to-device communication, as well as other devices and legacy devices in the system, to further transmit on uplink channels to the base station.

In one embodiment, the method of allocating network resources by a base station of a network includes allocating at least two blocks of an uplink channel of the network to a direct communication link between a first user equipment (UE) and a second UE. The method further includes determining that a rate of data transfer on the direct communication link is greater than a rate of data transfer for uplink communications between one of (i) the first UE and base station and (ii) the second UE and the base station. The method further includes re-allocating, based on the determining, at least one of the at least two uplink blocks allocated to the direct communication link to at least one of uplink communications by the first UE, the second UE, or other UEs with the base station.

In one embodiment, the method further includes controlling a transmission power for each of the first UE and the second UE on the direct communication link to be less than or equal to a transmission power permitted for uplink communications between one of (i) the first UE and the base station and (ii) the second UE and the base station, respectively.

In one embodiment, the re-allocating includes determining a minimum bandwidth required to support a rate of data transfer on the direct communication link equal to the rate of data transfer for uplink communications between one of (i) the first UE and the base station and (ii) the second UE and the base station. The re-allocating further includes subtracting the minimum bandwidth from a bandwidth allocated to the direct communication link to determine a re-allocation bandwidth.

In one embodiment, the method of allocating network resources by a base station of a network includes allocating at least one block of an uplink channel of the network to a first direct communication link between a first equipment (UE) and a second UE. The method further includes allocating at least the block of the uplink channel to a second direct communication link between a third UE and a fourth UE.

In one embodiment, the method further includes determining that the first UE and the second UE are outside a transmission range of the third UE and the fourth UE. The base station allocates to the second direct communication link if the determining determines that the first UE and the second UE are outside the transmission range of the third UE and the fourth UE.

In one embodiment, the method further includes controlling a transmission power on the first direct communication link and the second direct communication link to be less than or equal to a transmission power permitted for uplink communications between one of the first UE, the second UE, the third UE, the fourth UE, and the base station.

In one embodiment, the method further includes determining that a rate of data transfer on at least one of the first direct communication link and the second direct communication link is greater than a rate of data transfer for uplink communications between one of the first UE, the second UE, the third UE, the fourth UE, and the base station. The method further includes re-allocating, based on the determining, an uplink block allocated to the first direct communication link and the second direct communication link to at least one of uplink communications by the first UE, the second UE, the third UE, the fourth UE, and other UEs with the base station.

In one embodiment, the re-allocating includes determining a first minimum bandwidth required to support a rate of data transfer on the first direct communication link equal to the rate of data transfer for uplink communications between one of the first UE and the base station and the second UE and the base station. The method further includes determining a second minimum bandwidth required to support a rate of data transfer on the second direct communication link equal to the rate of data transfer for uplink communications between one of the third UE and the base station and the fourth UE and the base station. The method further includes subtracting the greater of the first minimum bandwidth and the second minimum bandwidth from a bandwidth allocated to the respective first direct communication link or second direct communication link to determine a re-allocation bandwidth.

The method may further include further allocating at least the block of the uplink channel to uplink communications of the first UE, the second UE, the third UE, the fourth UE, and other UEs with the base station.

In one embodiment, the further allocating is based on a determination of interference levels in a cell served by the base station.

In one embodiment, a base station is configured to allocate at least two blocks of an uplink channel of the network to a direct communication link between a first user equipment (UE) and a second UE. The base station is further configured to determine that a rate of data transfer on the direct communication link is greater than a rate of data transfer for uplink communications between one of (i) the first UE and base station and (ii) the second UE and the base station. The base station is further configured to re-allocate, based on the determining, at least one of the at least two uplink blocks allocated to the direct communication link to at least one of uplink communications by the first UE, the second UE, or other UEs with the base station.

In one embodiment, the base station is further configured to control a transmission power for each of the first UE and the second UE on the direct communication link to be less than or equal to a transmission power permitted for uplink communications between one of (i) the first UE and the base station and (ii) the second UE and the base station, respectively.

In one embodiment, the base station is further configured to determine a minimum bandwidth required to support a rate of data transfer on the direct communication link equal to the rate of data transfer for uplink communications between one of (i) the first UE and the base station and (ii) the second UE and the base station. The base station is further configured to subtract the minimum bandwidth from a bandwidth allocated to the direct communication link to determine a re-allocation bandwidth.

In one embodiment, the base station is configured to allocate at least one block of an uplink channel of the network to a first direct communication link between a first equipment (UE) and a second UE. The base station is further configured to allocate at least the block of the uplink channel to a second direct communication link between a third UE and a fourth UE.

In one embodiment, the base station is further configured to determine that the first UE and the second UE are outside a transmission range of the third UE and the fourth UE. The base station allocates to the second direct communication link if the determining determines that the first UE and the second UE are outside the transmission range of the third UE and the fourth UE.

In one embodiment, the base station is configured to control a transmission power on the first direct communication link and the second direct communication link to be less than or equal to a transmission power permitted for uplink communications between one of the first UE, the second UE, the third UE, the fourth UE, and the base station.

In one embodiment, the base station is configured to determine that a rate of data transfer on at least one of the first direct communication link and the second direct communication link is greater than a rate of data transfer for uplink communications between one of the first UE, the second UE, the third UE, the fourth UE, and the base station. The base station is further configured to re-allocate, based on the determining, an uplink block allocated to the first direct communication link and the second direct communication link to at least one of uplink communications by the first UE, the second UE, the third UE, the fourth UE, and other UEs with the base station.

In one embodiment, the base station is configured to determine a first minimum bandwidth required to support a rate of data transfer on the first direct communication link equal to the rate of data transfer for uplink communications between one of the first UE and the base station and the second UE and the base station. The base station is further configured to determine a second minimum bandwidth required to support a rate of data transfer on the second direct communication link equal to the rate of data transfer for uplink communications between one of the third UE and the base station and the fourth UE and the base station. The base station is further configured to subtract the greater of the first minimum bandwidth and the second minimum bandwidth from a bandwidth allocated to the respective first direct communication link or second direct communication link to determine a re-allocation bandwidth.

The base station is further configured to further allocate at least the block of the uplink channel to uplink communications of the first UE, the second UE, the third UE, the fourth UE, and other UEs with the base station.

In one embodiment, the further allocating is based on a determination of interference levels in a cell served by the base station.

BRIEF DESCRIPTION OF THE DRAWINGS

Example embodiments will be more clearly understood from the following detailed description taken in conjunction with the accompanying drawings.

DETAILED DESCRIPTION

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of tangible (or recording) storage medium. The tangible storage medium may be magnetic (e.g., a floppy disk or a hard drive) or optical (e.g., a compact disk read only memory, or "CD ROM"), and may be read only or random access. Example embodiments are not limited by these aspects of any given implementation.

As used herein, the term "user equipment" (UE) may be synonymous to a mobile user, mobile station, mobile terminal, user, subscriber, wireless terminal and/or remote station and may describe a remote user of wireless resources in a wireless communication network. The term "base station" may be understood as a one or more cell sites, enhanced Node-Bs (eNB), base stations, access points, and/or any terminus of radio frequency communication. Although current network architectures may consider a distinction between mobile/user devices and access points/cell sites, the example embodiments described hereafter may generally be applicable to architectures where that distinction is not so clear, such as ad hoc and/or mesh network architectures, for example.

The term "channel" may be understood as any combination of frequency band allocation, time allocation and code allocation.

Figure 1:
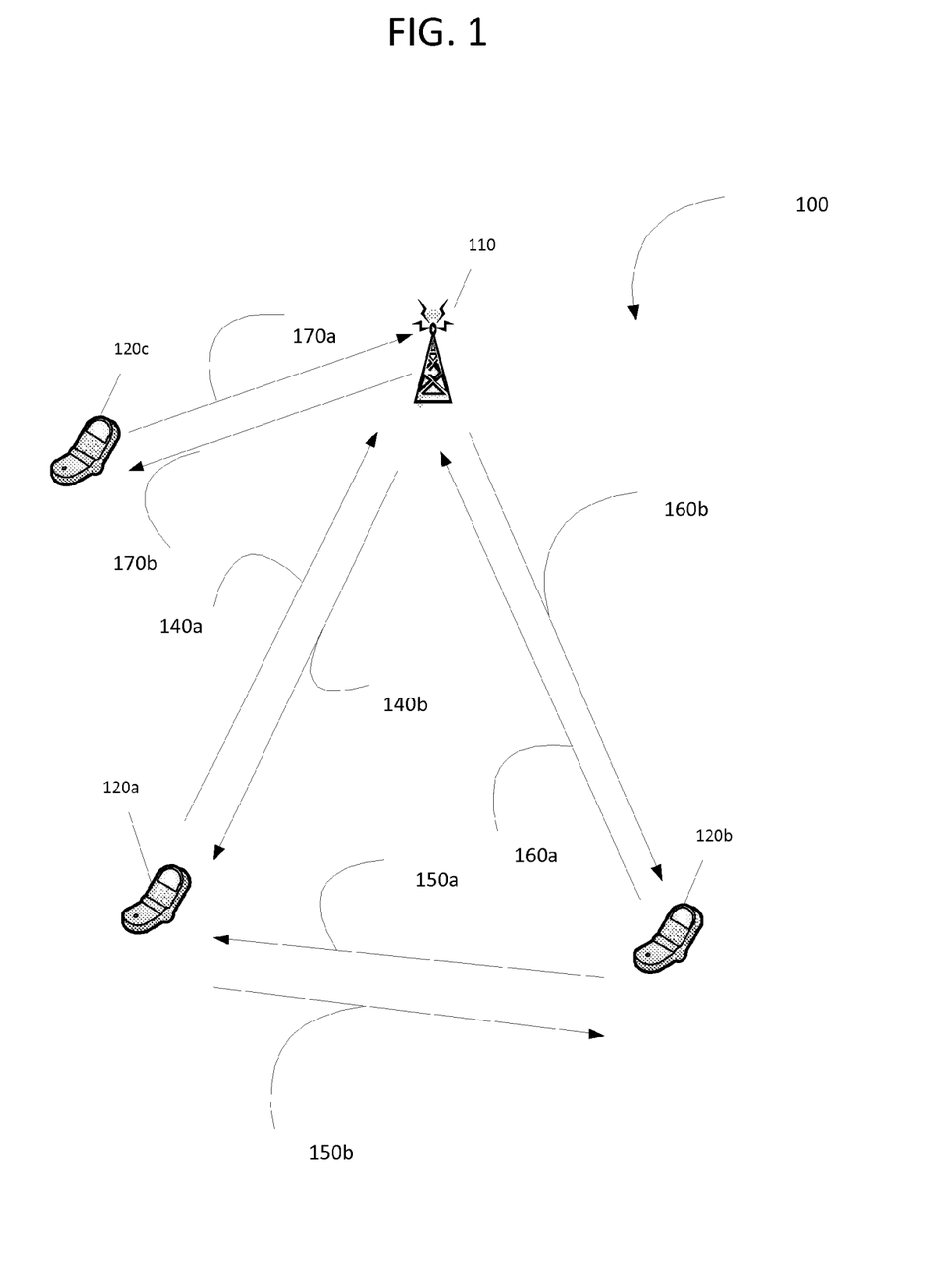
FIG. 1 illustrates an example embodiment of a network.

FIG. 1 illustrates a network in which example embodiments are implemented. As shown in FIG. 1, a network 100 includes a base station 110 and UEs 120a, 120b and 120c. The base station 110 may be an enhanced Node-B (eNB), for example. The base station 110 may serve a geographic area known as a cell.

In LTE systems, the uplink is frequency division multiplexed with different users being allocated time-frequency blocks known as physical resource blocks (PRBs). In the example embodiment shown in FIG. 1, the base station 110 schedules UEs 120a, 120b and 120c, as well as any other UEs in the system (not shown), to transmit data on these PRBs on an uplink traffic channel known as the Physical Uplink Shared Channel (PUSCH). UEs 120a, 120b, and 120c, and other UEs of the system, transmit feedback and control information on Physical Uplink Control Channel (PUCCh). Feedback and control information may include, for example, downlink transmission acknowledgments and downlink channel quality feedback. There may be full resource re-use across cells such that PRBs may be re-used in adjacent geographic cells (not shown).

Each UE 120a, 120b and 120c communicates with the base station 110 via pairs of bi-directional communication links 140a/140b, 160a/160b, and 170a/170b respectively. Each of the bi-directional links includes an uplink 140a, 160a, 170a and a downlink 140b, 160b and 170b.

The downlinks 140b, 160b and 170b are channels from the base station 110 to the UEs 120a, 120b, and 120c respectively. The base station 110 transmits on the downlinks 140b, 160b, and 170b and the UEs 120a, 120b and 120c receive on the downlinks 140b, 160b, and 170b respectively.

The uplinks 140a, 160a, and 170b are channels from the UEs 120a, 120b, and 120c to the base station 110. The UEs 120a, 120b and 120c transmit on the uplinks 140a, 160a, and 170a respectively, and the base station 110 receives on the uplinks 140a, 160a and 170a.

In at least one example embodiment, UEs 120a and 120b further receive on an uplink channel 150a/150b in order to receive data from a UE peer in a device-to-device communication. The base station 110 allocates PRBs for device-to-device communications on the uplink channel. The base station 110 further allocates PRBs for communications between the base station and UEs, including the UEs in device-to-device communication, on the uplink channel.

Each of the UEs 120a and 120b may perform a discovery method to discover UEs within a communication range. Alternatively, the base station 110 may initiate a discovery method to determine which UEs are within a communication range. The discovery process may be any known method of discovering peers. If one of the UEs 120a and 120b discovers that the other UE is within the communication range, the one of the UEs 120a and 120b may request direct communication.

In FIG. 1, the UEs 120a and 120b are considered to be within a communication range of each other.

Because the UEs 120a and 120b are within a communication range, at least one of the UEs 120a and 120b transmits a request for direct communication to the base station 110 through the respective uplink 140a or 160a. In response to the request, the base station 110 allocates uplink resources for a direct communication link 150a/150b between UE 120a and 120b. Uplink resources may be allocated according to at least the methods shown with respect to FIGS. 4-7, described below.

Furthermore, the UE 120c, which is in the vicinity of the peering UEs 120a and 120b can continue to communicate with the base station 110 since additional transmission occurs on the downlink from the base station 110.

Figure 2:
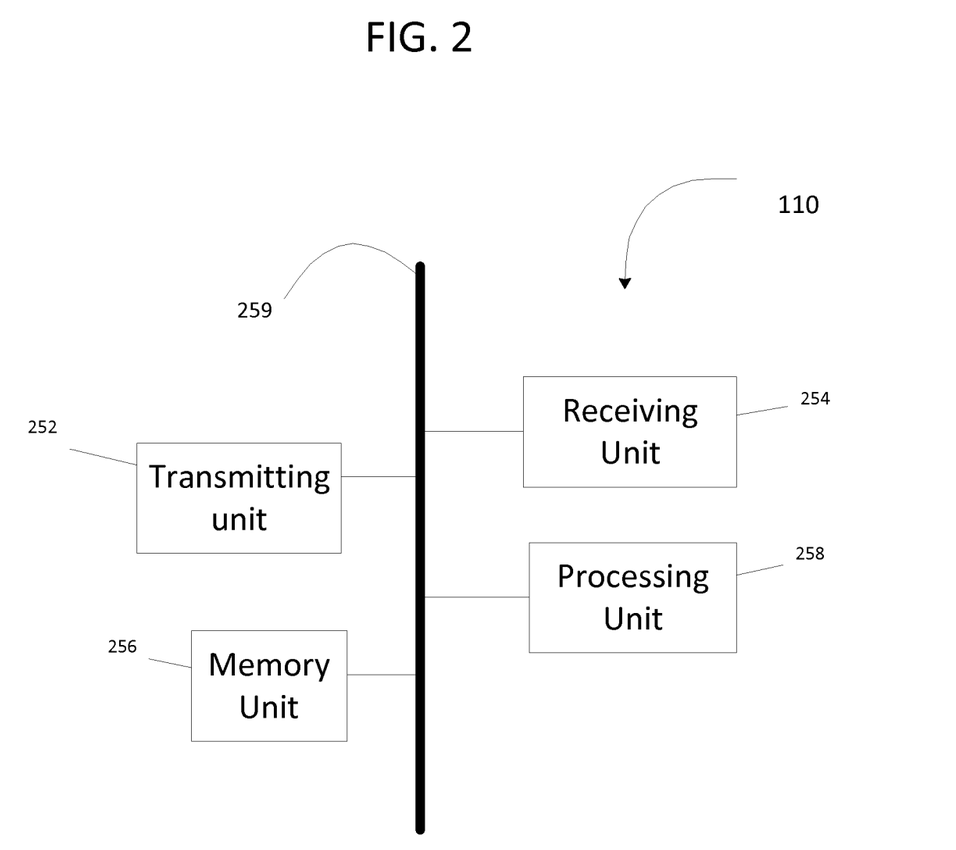
FIG. 2 illustrates an example embodiment of a base station.

FIG. 2 illustrates an example embodiment of the base station 110. It should be also understood that the base station 110 may include features not shown in FIG. 2 and should not be limited to those features that are shown.

Referring to FIG. 2, the base station 110 may include, for example, a data bus 259, a transmitting unit 252, a receiving unit 254, a memory unit 256, and a processing unit 258.

The transmitting unit 252, receiving unit 254, memory unit 256, and processing unit 258 may send data to and/or receive data from one another using the data bus 259. The transmitting unit 252 is a device that includes hardware and any necessary software for transmitting wireless signals including, for example, data signals, control signals, and signal strength/quality information via one or more wireless connections to other network elements in the wireless communications network 100.

The receiving unit 254 is a device that includes hardware and any necessary software for receiving wireless signals including, for example, data signals, control signals, and signal strength/quality information via one or more wireless connections to other network elements in the network 100.

The memory unit 256 may be any device capable of storing data including magnetic storage, flash storage, etc.

The processing unit 258 may be any device capable of processing data including, for example, a microprocessor configured to carry out specific operations based on input data, or capable of executing instructions included in computer readable code. The computer readable code may be stored on, for example, the memory unit 256.

For example, the processing unit 258 is capable of determining when UEs are within a communication range. The processing unit 258 is also configured to allocate resources to direct communication links. For example, the processing unit 258 is configured to allocate uplink channel PRBs to direct communication links on links 150a/150b or to other, for example UE-to-base station, uplink communications on links 140b, 160b and 170b.

Figure 3:
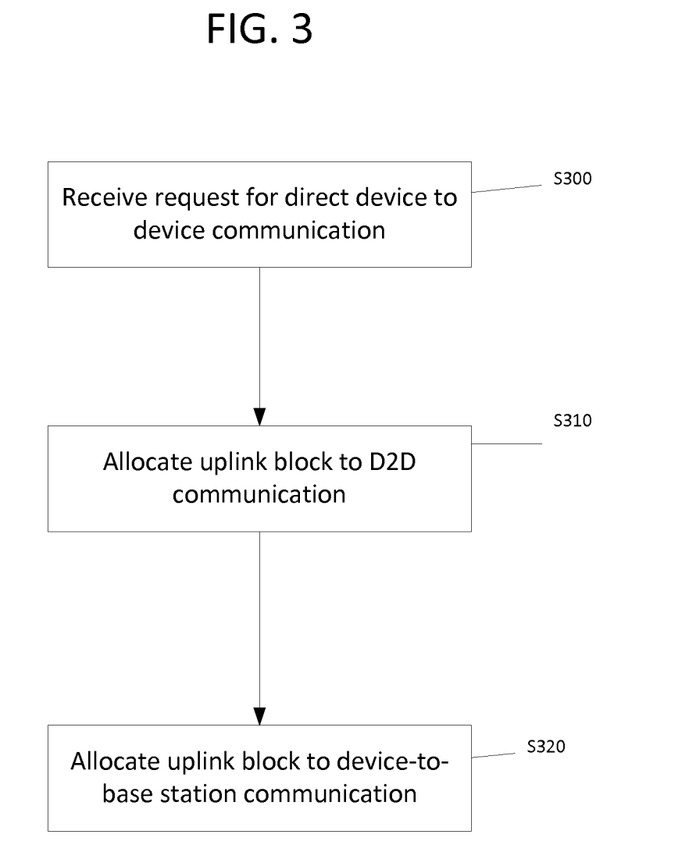
FIG. 3 illustrates a method of allocating resources according to an example embodiment.

FIG. 3 illustrates a method of allocating network resources for direct communication between first and second UEs. The method shown in FIG. 3 may be performed by the base station 110 shown in FIG. 1.

As shown, at S300, the base station 110 receives a request from a UE 120a or 120b for direct communication with a second UE 120a or 120b. The request is received over the uplink 140a or 160a.

Once the base station 110 receives the request, the base station allocates, in step S310, at least one physical resource block (PRB) for direct device-to-device communication. The base station 110 further allocates, in step S320, at least one PRB for UE-to-base station communication. The UE-to-base station communication may be, for example, legacy uplink communications between UEs 120a and 120b and the base station 110. Alternatively, or in addition, the UE-to-base station communication may be communication between UE 120c and the base station 110. The base station 110 allocates PRBs according to different schemes, described in detail with respect to FIGS. 4-7.

Each of the schemes illustrated in FIGS. 4-7 allows both device-to-device and network-connected traffic to access uplink channel resources.

Figure 4:
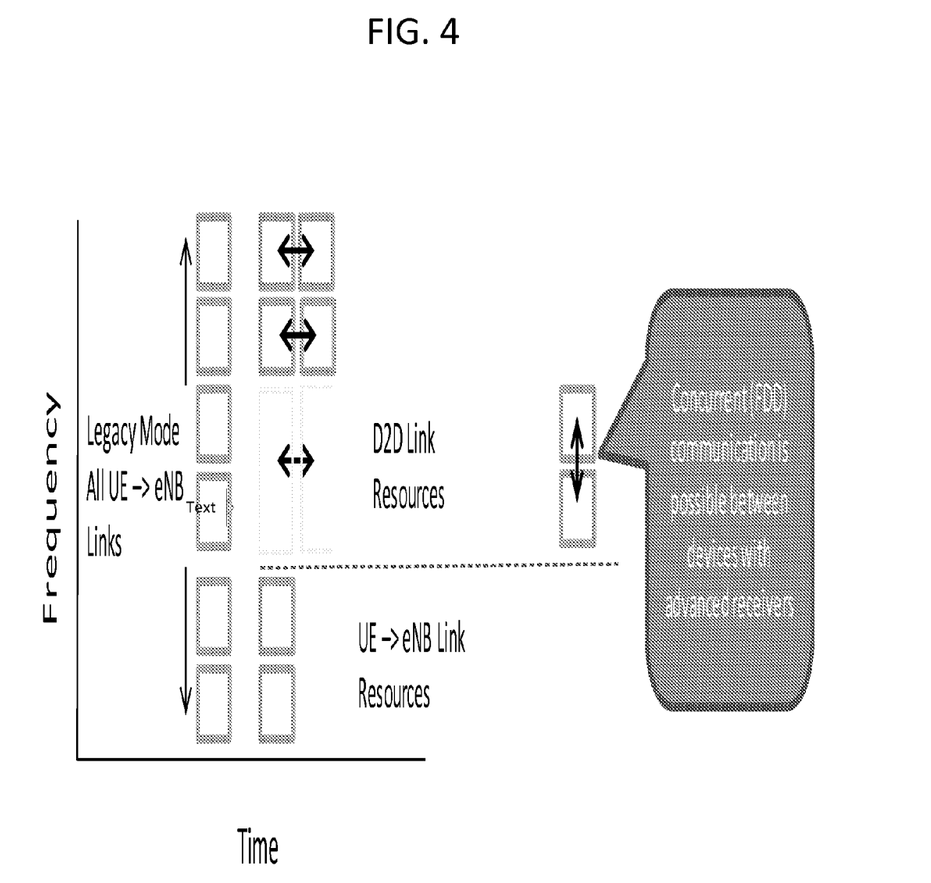
FIGS. 4-7 illustrate resource allocations according to example embodiments.

Referring to FIG. 4, the left-hand column illustrates that each UE 120a, 120b and 120c in network 100 concurrently transmits on the uplink to the base station 110 using the PRBs assigned to them, as is known in current legacy systems.

The column on the right-hand side of FIG. 4 illustrates that the PRBs, used by UEs 120a and 120b to transmit to the base station 110, are further and additionally used for direct device-to-device communication. In an example embodiment, the base station 110 schedules the two forms of communication in a time-division multiplexed manner.

In at least this example embodiment, the base station 110 allocates some PRBs for both device-to-device communication and communication to the base station by alternating the transmission intervals.

As can further be seen in the right-hand column of FIG. 4, other PRBs remain allocated for uplink channel communications to the base station 110 according to at least one example embodiment.

Figure 5:
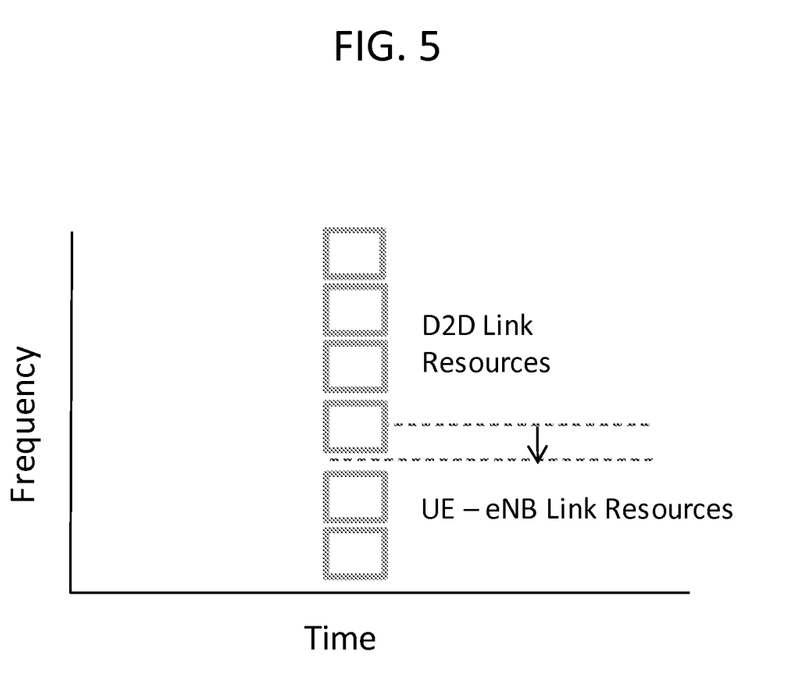

An alternative scheme is depicted in FIG. 5. As shown in FIG. 5, PRBs are allocated either to device-to-device communications or UE-to-base station communications. The base station 110 therefore does not need to perform scheduling operations to alternate transmission intervals for UEs 120a and 120b from device-to-device to UE-to-base station transmissions.

The base station 110 may allocate power to the direct communication links 150a/150b. The base station 110 may allocate power under at least one of two power allocation schemes.

Under a first power allocation scheme, the base station 110 may allocate power to limit the rate of data transfer on the direct links 150a/150b to that which would have been possible if the same communication were routed over the network, i.e. via a pair of bi-directional links passing from each UE 120a/120b through the base station 110 to the other UE 120a/120b. In this case, as is known, the data transfer can be accomplished over the direct link 150a/150b with much lower power than data transfer via the base station 110. By thus reducing the power, therefore, interference caused by the direct links 150a/150b to adjacent cells (not shown) may be reduced or eliminated, improving uplink throughput in these cells relative to the throughput that would have been seen if data transfer occurred via the base station 110.

Under a second power allocation scheme, the base station 110 may maintain the transmit power for the direct links 150a/150b at the level that would have been permitted for each of UE 120a/120b to communicate via the base station 110. This would leave the interference to adjacent cells (not shown) unchanged from legacy system operation. However the transfer rates on the direct link 150a/150b under this power allocation scheme would be significantly higher than would have been supported on communications routed via the base station 110, because device-to-device communications use power more efficiently than UE-to-base station communications.

Because the data transfer rates under the second power allocation scheme are higher, fewer PRBs are required to support the same throughput on the direct link 150a/150b. Therefore, base station 110 may re-allocate PRBs, which were previously assigned to direct link 150a/150b, to UE-to-base station uplink communications. This has the further effect of increasing the uplink bandwidth capacity allocated to legacy system users.

Under the second power allocation scheme, for PRB allocations according to FIGS. 4 and 5, data transfer rates are improved, and bandwidth allocations may be adjusted, according to the following discussion illustrated by equations (1)-(4).

As an illustrative example, consider the rate $R_{Ni}$ that can be supported on a UE-to-base station link for a particular pair of UEs 120a/120b:

$$R_{Ni} = W_N \log_2(1 + SINR_{Ni}), i \in 1,2 \qquad (1)$$

where $W_N$ is the bandwidth that would have been assigned to each UE if its data was routed through the eNB and $SINR_{Ni}$ is the signal-to-noise ratio for communications between each UE 120a/120b and base station 110.

For the direct link 150a/150b for the same UE pair 120a/120b, with the same power and bandwidth allocation as for the UE-to-base station link, the device-to-device rate $R_{d2d}$ will be:

$$R_{d2d} = W_{d2d} \log_2(1 + SINR_{d2d}) \qquad (2)$$

where $SINR_{d2d}$ is the signal-to-noise ratio for communications between UE 120a/120b when they are in direct communication over link 150a/150b. In at least this embodiment, $W_{d2d}$ may equal $W_N$.

$R_{d2d}$ is much greater than $R_N$ because the proximity of the UEs 120a and 120b leads to a much higher signal-to-noise ratio. Such a high rate may not be needed for the application and bandwidth may therefore be unutilized.

It may therefore be advantageous for the base station 110 to allocate PRBs to reduce the bandwidth to $W_{d2d} < W_N$ required to support a lower direct link data rate $R_{d2d} = R_{N1}$. This may allow the base station 110 to re-allocate bandwidth $W_N - W_{d2d}$ to other UE-to-base station 110 links thus increasing the overall capacity of the system. The possible reduction can be shown to be:

$$W_{d2d} = W_N \frac{\log(1 + SINR_N)}{\log(1 + SINR_{d2d})} \qquad (3)$$

As an illustrative example, using typical $SINR_N=10$ dB and $SINR_{d2d}=20$ dB, we find:

$$W_{d2d} = 0.5 * W_N \qquad (4)$$

Thus half the bandwidth that would normally have been allocated to a device-to-device user if he was communicating through the base station 110 can be re-allocated by the base station 110 to other users in the system, when he communicates directly, increasing the overall capacity of the system.

In at least this way, PRB and power allocation schemes according to example embodiments may increase system capacity without causing degradation in data rates for legacy or device-to-device users.

Figure 6:
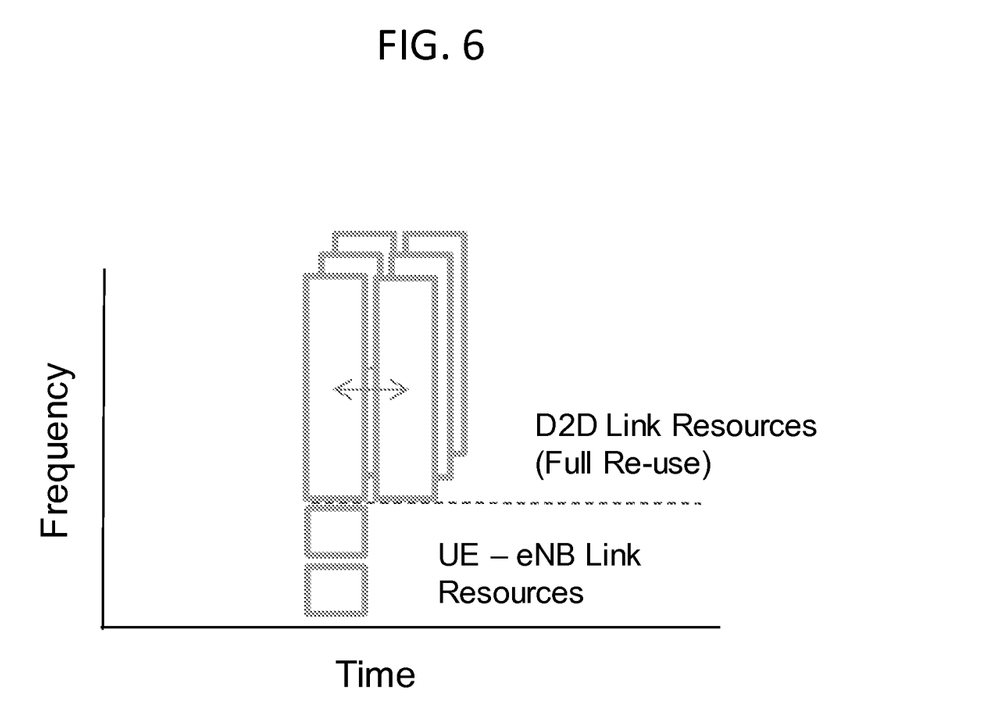

Referring now to FIG. 6, a further PRB allocation scheme is illustrated. The scheme of FIG. 6 utilizes orthogonal group re-use, in which PRBs are re-used within a cell for different pairs of UEs in direct device-to-device communication. The base station 110 further maintains orthogonality in resource allocation between device-to-device communications and network-routed links. The base station 110 may utilize an orthogonal group re-use allocation under the assumption that pairs of UEs in direct communication are not close enough to other pairs to cause interference.

In illustrative embodiments, further pairs (not shown) of UEs may be distributed in network 100 across a geographic area served by base station 110. The further pairs of UEs may be distributed such that they are unlikely to interfere with each other or with pair 120a/120b. Interference may be reduced or nonexistent even if the pairs operate with the same power that would have been used for network-routed communication. Power, and therefore interference, may be reduced still further if base station 110 implements a power allocation scheme to reduce the power to that required to maintain a data transfer rate equivalent to network-routed communication data rates.

Figure 7:
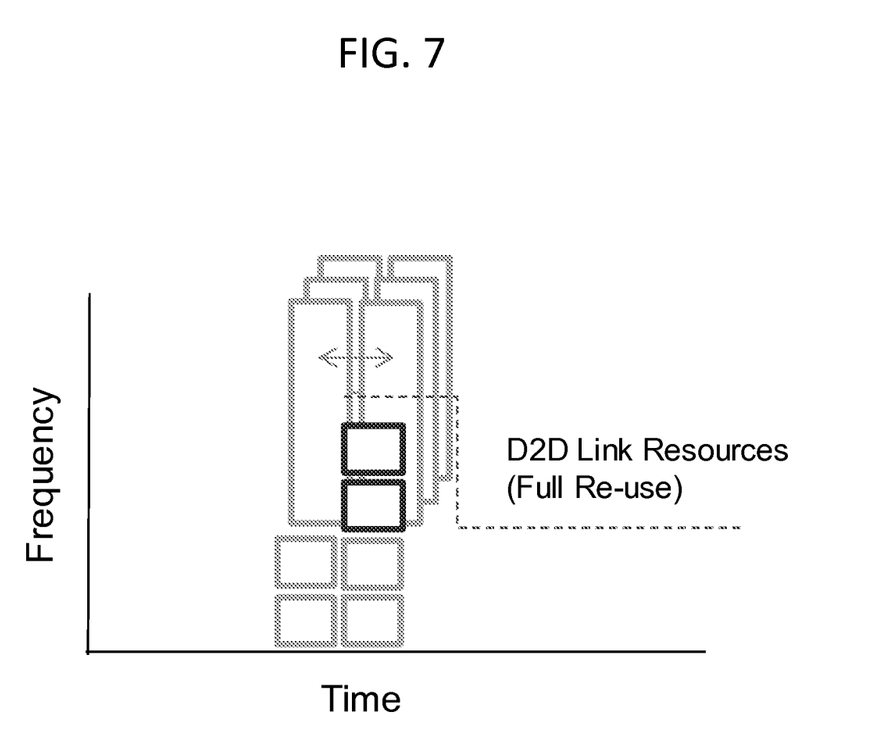

FIG. 7 illustrates a further allocation scheme according to at least one example embodiment. In this allocation scheme, referred to herein as "hyper re-use," the base station 110 allocates uplink PRBs such that resources are re-used among pairs of direct links, as with the scheme illustrated above with regard to FIG. 6.

Additionally, the base station 110 further allocates the same PRBs to UE-to-base station uplink communications to further increase system capacity. The base station 110 performs this further allocation based on determinations of the potential for interference between UE-to-base station communications and direct link communications. If uplink transmissions from a UE connected to the base station 110 cannot be received by devices in direct device-to-device communications, because of proximity, obstruction due to buildings, etc., the base station 110 may hyper re-use certain of the PRBs allocated to device-to-device communications. In this way, system capacity may be further increased without increasing intra-cell interference.

According to illustrative embodiments, operators can reduce inter-cell interference and increase cell throughput by allocating uplink resources to device-to-device communications. Due to efficiencies of device-to-device communications, data transfer rates can be maintained at an acceptable level with a lower power requirement relative to network-routed communications. The reduced power requirements can in turn reduce or eliminate interference to adjacent cells and to other uplink or downlink intra-cell communications, resulting in higher data throughputs.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A method of allocating network resources by a base station of a network, the method comprising:
    allocating at least two blocks of an uplink channel of the network to a direct communication link between a first user equipment (UE) and a second UE;
    determining that a rate of data transfer on the direct communication link is greater than a rate of data transfer for uplink communications between one of (i) the first UE and base station and (ii) the second UE and the base station; and
    re-allocating, based on the determining, at least one of the at least two uplink blocks allocated to the direct communication link to at least one of uplink communications by the first UE, the second UE, or other UEs with the base station.

2. The method of claim 1, further comprising:
    controlling a transmission power for each of the first UE and the second UE on the direct communication link to be less than or equal to a transmission power permitted for uplink communications between one of (i) the first UE and the base station and (ii) the second UE and the base station, respectively.

3. The method of claim 1, wherein the re-allocating comprises:
    determining a minimum bandwidth required to support a rate of data transfer on the direct communication link equal to the rate of data transfer for uplink communications between one of (i) the first UE and the base station and (ii) the second UE and the base station; and
    subtracting the minimum bandwidth from a bandwidth allocated to the direct communication link to determine a re-allocation bandwidth.

4. A method of allocating network resources by a base station of a network, the method comprising:
- allocating at least a block of an uplink channel of the network to a first direct communication link between a first user equipment (UE) and a second UE; and
- allocating at least the block of the uplink channel to a second direct communication link between a third UE and a fourth UE;
- determining that a rate of data transfer on at least one of the first direct communication link and the second direct communication link is greater than a rate of data transfer for uplink communications between one of the first UE, the second UE, the third UE, the fourth UE, and the base station; and
- re-allocating, based on the determining, an uplink block allocated to the first direct communication link and the second direct communication link to at least one of uplink communications by the first UE, the second UE, the third UE, the fourth UE, and other UEs with the base station.

5. The method of claim 4, further comprising:
- determining that the first UE and the second UE are outside a transmission range of the third UE and the fourth UE, and wherein,
  - the base station allocates to the second direct communication link if the determining determines that the first UE and the second UE are outside the transmission range of the third UE and the fourth UE.

6. The method of claim 4, further comprising:
- controlling a transmission power on the first direct communication link and the second direct communication link to be less than or equal to a transmission power permitted for uplink communications between one of the first UE, the second UE, the third UE, the fourth UE, and the base station.

7. The method of claim 4, wherein the re-allocating comprises:
- determining a first minimum bandwidth required to support a rate of data transfer on the first direct communication link equal to the rate of data transfer for uplink communications between one of the first UE and the base station and the second UE and the base station;
- determining a second minimum bandwidth required to support a rate of data transfer on the second direct communication link equal to the rate of data transfer for uplink communications between one of the third UE and the base station and the fourth UE and the base station;
- subtracting the greater of the first minimum bandwidth and the second minimum bandwidth from a bandwidth allocated to the respective first direct communication link or second direct communication link to determine a re-allocation bandwidth.

8. The method of claim 4, further comprising:
- further allocating at least the block of the uplink channel to at least one of uplink communications of the first UE, the second UE, the third UE, the fourth UE, and other UEs with the base station.

9. The method of claim 8, wherein the further allocating is based on a determination of interference levels in a cell served by the base station.

10. A base station configured to:
- allocate at least two blocks of an uplink channel of the network to a direct communication link between a first user equipment (UE) and a second UE;
- determine that a rate of data transfer on the direct communication link is greater than a rate of data transfer for uplink communications between one of (i) the first UE and base station and (ii) the second UE and the base station; and
- re-allocate, based on the determining, at least one of the at least two uplink blocks allocated to the directed communication link to at least one of uplink communications by the first UE, the second UE, or other UEs with the base station.

11. The base station of claim 10, wherein the base station is further configured to:
- control a transmission power for each of the first UE and the second UE on the direct communication link to be less than or equal to a transmission power permitted for uplink communications between one of (i) the first UE and the base station and (ii) the second UE and the base station, respectively.

12. The base station of claim 10, wherein the base station is further configured to:
- determine a minimum bandwidth required to support a rate of data transfer on the direct communication link equal to the rate of data transfer for uplink communications between one of the (i) first UE and the base station and (ii) the second UE and the base station; and
- subtract the minimum bandwidth from a bandwidth allocated to the direct communication link to determine a re-allocation bandwidth.

13. A base station configured to:
- allocate at least a block of an uplink channel of the network to a first direct communication link between a first user equipment (UE) and a second UE;
- allocate at least the block of the uplink channel to a second direct communication link between a third UE and the fourth UE;
- determine that a rate of data transfer on at least one of the first direct communication link and the second direct communication link is greater than a rate of data transfer for uplink communications between one of the first UE, the second UE, the third UE, the fourth UE, and the base station; and
- re-allocate, based on the determining, an uplink block allocated to the first direct communication link and the second direct communication link to at least one of uplink communications by the first UE, the second UE, the third UE, the fourth UE, and other UEs with the base station.

14. The base station of claim 13, wherein the base station is further configured to:
- determine that the first UE and the second UE are outside a transmission range of the third UE and the fourth UE, and wherein,
  - the base station allocates to the second direct communication link if the determining determines that the first UE and the second UE are outside the transmission range of the third UE and the fourth UE.

15. The base station of claim 13, wherein the base station is further configured to:
- control a transmission power on the first direct communication link and the second direct communication link to be less than or equal to a transmission power permitted for uplink communications between one of the first UE, the second UE, the third UE, the fourth UE, and the base station.

16. The base station of claim 13, wherein the base station is further configured to:
- determine a first minimum bandwidth required to support a rate of data transfer on the first direct communication link equal to the rate of data transfer for uplink communications between one of the first UE and the base station and the second UE and the base station;

determine a second minimum bandwidth required to support a rate of data transfer on the second direct communication link equal to the rate of data transfer for uplink communications between one of the third UE and the base station and the fourth UE and the base station;

subtract the greater of the first minimum bandwidth and the second minimum bandwidth from a bandwidth allocated to the respective first direct communication link or second direct communication link to determine a re-allocation bandwidth.

17. The base station of claim 13, wherein the base station is further configured to:

allocate at least the block of the uplink channel to uplink communications of other UEs with the base station.

18. The base station of claim 17, wherein the base station is configured to further allocate at least the block of the uplink channel to uplink communications of other UEs with the base station based on a determination of interference levels in a cell served by the base station.

\* \* \* \* \*